(12) United States Patent
Hibbard, Jr. et al.

(10) Patent No.: US 9,148,212 B2
(45) Date of Patent: Sep. 29, 2015

(54) MOTOR VEHICLE ANTENNA SYSTEM

(71) Applicant: GM Global Technology Operations LLC, Detroit, MI (US)

(72) Inventors: Donald B. Hibbard, Jr., Howell, MI (US); Gregg R. Kittinger, Pontiac, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 168 days.

(21) Appl. No.: 13/968,902

(22) Filed: Aug. 16, 2013

(65) Prior Publication Data

US 2015/0051831 A1 Feb. 19, 2015

(51) Int. Cl.
*H04B 7/08* (2006.01)
*G01S 19/13* (2010.01)
*H04B 1/12* (2006.01)
*H04B 1/10* (2006.01)
*H04B 1/06* (2006.01)

(52) U.S. Cl.
CPC .............. *H04B 7/0805* (2013.01); *G01S 19/13* (2013.01); *H04B 1/10* (2013.01); *H04B 1/109* (2013.01); *H04B 1/1027* (2013.01); *H04B 1/123* (2013.01); *H04B 1/126* (2013.01); *H04B 7/0814* (2013.01); *H04B 1/06* (2013.01)

(58) Field of Classification Search
CPC .......... H04B 7/0805; H04B 1/06; H04B 1/10; H04B 1/1027; H04B 1/109; H04B 1/123; H04B 1/126; H04B 7/0814; G01S 19/13
USPC ................... 701/468–470; 343/893; 455/3.01
See application file for complete search history.

(56) References Cited

U.S. PATENT DOCUMENTS

| | | | |
|---|---|---|---|
| 6,433,749 B1 * | 8/2002 | Thompson | 343/713 |
| 7,598,901 B2 * | 10/2009 | Tillotson et al. | 342/26 B |
| 8,005,418 B2 * | 8/2011 | Walker et al. | 455/3.02 |
| 2002/0115436 A1 * | 8/2002 | Howell et al. | 455/426 |
| 2010/0234071 A1 * | 9/2010 | Shabtay et al. | 455/562.1 |

* cited by examiner

Primary Examiner — Russell Frejd
(74) Attorney, Agent, or Firm — Cantor Colburn LLP

(57) ABSTRACT

An antenna system includes a controller operatively connected to a first antenna and a second antenna, the controller including a vehicle position input configured and disposed to receive GPS position data identifying a location of a motor vehicle and a vehicle heading input configured and disposed to receive GPS heading data for the motor vehicle. The controller is configured and disposed to selectively employ at least one of the first and second antennas to receive a radio signal based on received location and heading data for the motor vehicle.

19 Claims, 2 Drawing Sheets

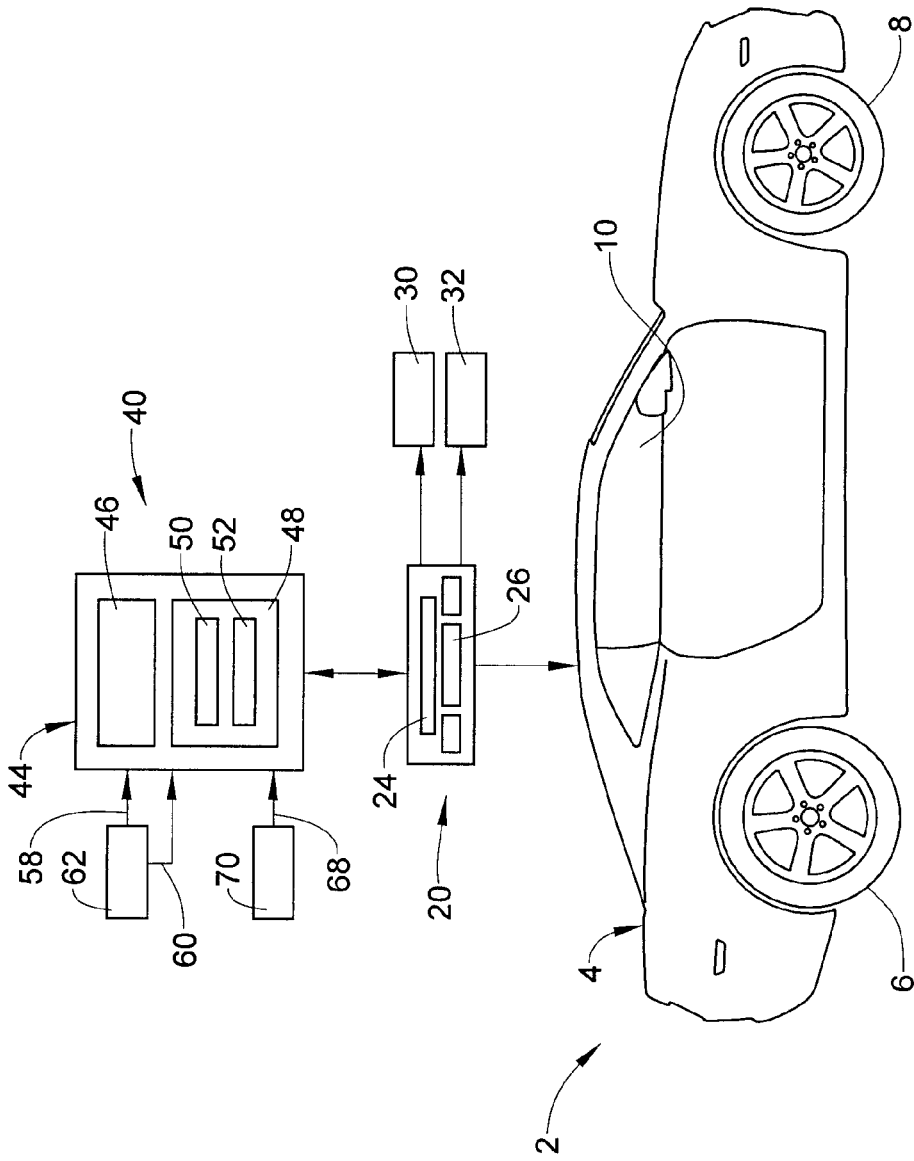

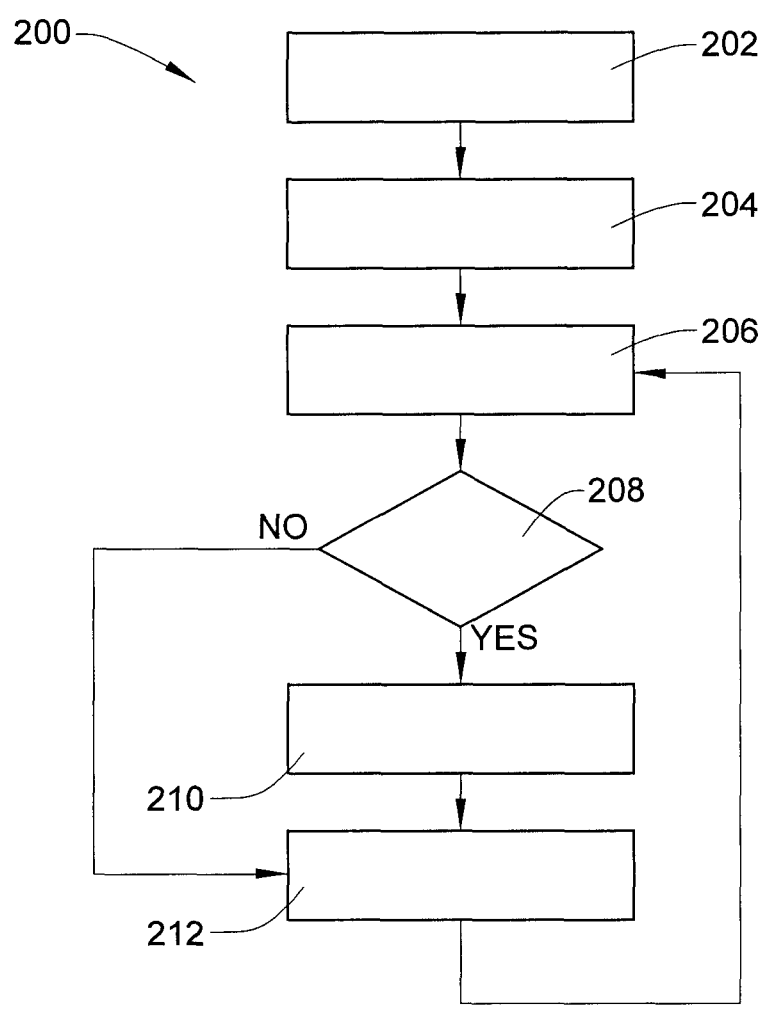

MOTOR VEHICLE ANTENNA SYSTEM

FIELD OF THE INVENTION

The subject invention relates to the art of motor vehicles and, more particularly, to an antenna system for a motor vehicle.

BACKGROUND

Motor vehicles are typically equipped with radios that are configured to receive signals from various radio stations. The radios include one or more antennas that are configured to receive AM signals, and one or more antennas configured to receive FM signals. Often times, when travelling, a distance between the motor vehicle and a radio tower broadcasting a desired station becomes far enough that reception weakens. Weak reception leads to static or other undesirable noise that interferes with listening pleasure. Other, undesirable noise may include broadcast signals from another radio station that may be stronger than signals from the desired station.

Motor vehicles with multiple antennas may include a provision to employ one or more antennas to enhance reception. However, the antennas are generally employed to enhance reception of a stronger signal. If the desired radio station has a weaker signal, the radio system may default to the less desirable radio station or not utilize the full multi antenna element capability. Accordingly, it is desirable to provide a motor vehicle with an antenna system that has knowledge of multi element antenna gain and patterns to enable the radio to differentiate between radio signals and employ one or more antennas to receive signals from a desired radio station.

SUMMARY OF THE INVENTION

In accordance with an exemplary embodiment, an antenna system includes a controller operatively connected to a first antenna and a second antenna, the controller including a vehicle position input configured and disposed to receive GPS position data identifying a location of a motor vehicle and a vehicle heading input configured and disposed to receive GPS heading data for the motor vehicle. The controller is configured and disposed to selectively employ at least one of the first and second antennas to receive a radio signal based on received location and heading data for the motor vehicle.

In accordance with another exemplary embodiment, a motor vehicle includes a radio, a first antenna operatively connected to the radio, a second antenna operatively connected to the radio, and a controller operatively connected to the first antenna and the second antenna. The controller includes a vehicle position input configured and disposed to receive GPS position data identifying a location of a motor vehicle, and a vehicle heading input configured and disposed to receive GPS heading data for the motor vehicle. The controller is configured and disposed to selectively employ at least one of the first and second antennas to receive a radio signal based on received location and heading data for the motor vehicle.

In accordance with yet another exemplary embodiment, a method of receiving radio signals includes receiving a position of a motor vehicle through a global positioning system (GPS) unit, determining a direction of travel of the motor vehicle through the GPS unit, receiving a radio signal at a radio in the motor vehicle, receiving an another radio signal at the radio, the another radio signal causing interference with the desired radio signal, and selectively configuring at least one of a plurality of antennas to focus on the desired radio signal and substantially remove the interference from the undesired radio signal based on the position and direction of travel of the motor vehicle.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 1 is a side view of a motor vehicle having an antenna system, in accordance with an exemplary embodiment; and FIG. 2 is a flow diagram illustrating a method of receiving radio signals, in accordance with an exemplary embodiment.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features. A motor vehicle, in accordance with an exemplary embodiment, is indicated generally at 2, in FIG. 1. Motor vehicle 2 includes a body 4 supported upon a chassis (not shown) which, in turn, supports a pair of rear wheels, one of which is indicated at 6, and a pair of front wheels, one of which is indicated at 8. Body 4 includes an interior 10 that provides room for a driver and one or more passengers. Motor vehicle 2 includes a radio 20 arranged in interior 10. Radio 20 includes a display 24 and a number of pre-sets, one of which is indicated at 26. Pre-sets 26 enable a user to select and save desired radio station settings. Radio 20 is also shown to be operatively connected to a first antenna 30 and a second antenna 32. At this point it should be understood that the number of antennas connected to radio 20 may vary.

In accordance with an exemplary embodiment, motor vehicle 2 includes an antenna system 40 operatively connected to first and second antennas 30 and 32 through radio 20. Antenna system 40 includes a controller 44 having a central processor unit (CPU) 46 and a memory 48. Controller 44 may be a separate unit or may be part of radio 20. Memory 48 may store an electromagnetic compatibility (EMC) data look-up table 50 that contains electromagnetic interference data associated with motor vehicle 2, and a broadcast transmitter location look-up table 52 that contains a list of broadcast antenna locations for various radio stations by identification codes recognized by the Federal Communications Commission (FCC). Controller 44 also includes/receives a vehicle position input 58 and a vehicle heading input 60. Vehicle position input 58 and vehicle heading input 60 are operatively connected to a global positioning system (GPS) unit 62 arranged in motor vehicle 2. In addition, controller 44 includes/receives a radio data system (RDS) input 68 as part of the broadcast which is located in the receiver as decoded data within the FM or AM broadcast connected to an RDS signal receiver 70. RDS signal receiver 70 may be arranged in radio 20 or provided as a separate unit. Similarly, controller 44 may form part of radio 20 or may be provided as a separate system.

Reference will now follow to FIG. 2 in describing a method 200 of receiving radio signals with antenna system 40. Controller 44 receives position data from GPS unit 62 through vehicle position input 58, in block 202. In block 204, controller 44 receives vehicle heading data from GPS unit 62 through vehicle heading input 60. A radio signal is received in block 206. Controller 44, in block 208, determines whether the received radio signal is a desired radio signal. A desired radio signal may be determined through, for example, a tuner, an input from one of pre-sets 26, or through radio history. In other words, controller 44 may look at a previous listening preference stored in memory 48 to designate the signal as a desired radio signal. In block 210, controller 44 establishes a desired configuration or sets an antenna algorithm to configure one, the other, or both of antennas 30 and 32 to receive the desired radio signal. The desired configuration may be determined by stored antenna gain pattern data. If, on the other hand, in block 208, it is determined that the radio signal is undesired, controller 44 establishes an antenna algorithm, in block 212, that enhances reception of the desired radio signal.

In some cases, the desired signal may have a signal strength that is less than the undesired radio signal. In other words, undesired signals may emanate from transmitters having a stronger signal strength than that of the desired radio signal which may emanate from transmitters that are further away. Alternatively, undesired signals may represent electromagnetic interference from motor vehicle to or the like. In the case of an interfering stronger signal, controller 44 may employ broadcast transmitter location look-up table 52 to determine the broadcast location of the desired signal. Once determined, controller 44 may set an antenna algorithm to focus on the desired signal from the broadcast location. More specifically, controller 44 will create an antenna algorithm that focuses on a weaker signal that is transmitted from the broadcast location. If the undesired radio signal represents electromagnetic noise, controller 44 may reference EMC data look-up table 50 for data useful in filtering out the undesired noise. In addition, controller 44 will reconfigure the antennal algorithm to receive the desired radio signal as motor vehicle 2 travels.

At this point, it should be understood that the exemplary embodiments describe an antenna system that configures multiple antennas to receive desired radio signals over a potentially stronger undesired signal. The system may also be configured to filter out undesired electromagnetic noise. While described as being indirectly connected to the antennas, the antenna system may also be directly connected to the antennas. Also, while described as including two antennas, it should be understood that the number of antennas can vary.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An antenna system comprising:
a controller operatively connected to a first antenna and a second antenna, each of the first and second antennas being configured to receive at least one of an FM radio signal and an AM radio signal, the controller including a vehicle position input configured and disposed to receive GPS position data identifying a location of a motor vehicle and a vehicle heading input configured and disposed to receive GPS heading data for the motor vehicle, the controller being configured and disposed to selectively configure at least one of the first and second antennas to receive the one of the FM radio signal and AM radio signal based on received location and heading data for the motor vehicle.

2. The antenna system according to claim 1, wherein the controller further includes a radio data system (RDS) input, the controller being configured and disposed to selectively employ at least one of the first and second antennas to receive the radio signal based on RDS data received through the RDS input.

3. The antenna system according to claim 1, wherein the controller further includes a memory having stored therein an electromagnetic compatibility (EMC) data look-up table associated with the motor vehicle, the controller being configured and disposed to selectively employ at least one of the first and second antennas to receive the radio signal based on the EMC data for the motor vehicle.

4. A motor vehicle comprising:
a radio;
a first antenna operatively connected to the radio;
a second antenna operatively connected to the radio; and
a controller operatively connected to the first antenna and the second antenna, each of the first and second antennas being configured to receive at least one of an FM radio signal and an AM radio signal, the controller including a vehicle position input configured and disposed to receive GPS position data identifying a location of a motor vehicle and a vehicle heading input configured and disposed to receive GPS heading data for the motor vehicle, the controller being configured and disposed to selectively configure at least one of the first and second antennas to receive the one of the FM radio signal and AM radio signal based on received location and heading data for the motor vehicle.

5. The motor vehicle according to claim 4, wherein the controller further includes a radio data system (RDS) input, the controller being configured and disposed to selectively employ at least one of the first and second antennas to receive the radio signal based on RDS data received through the RDS input.

6. The motor vehicle according to claim 4, wherein the controller further includes a memory having stored therein an electromagnetic compatibility (EMC) data look-up table associated with the motor vehicle, the controller being configured and disposed to selectively employ at least one of the first and second antennas to receive the radio signal based on the EMC data for the motor vehicle.

7. A method of receiving radio signals comprising:
receiving a position of a motor vehicle through a global positioning system (GPS) unit;
determining a direction of travel of the motor vehicle through the GPS unit;
receiving a first one of an FM radio signal and an AM radio signal at a radio in the motor vehicle;
receiving a second one of an FM radio signal and an AM radio signal at the radio, the second one of the FM radio signal and the AM radio signal causing interference with the first one of the FM radio signal and the AM radio signal;
selectively configuring at least one of a plurality of antennas to focus on the first one of the FM radio signal and the AM radio signal and substantially remove the interference from the second one of the FM radio signal and the AM radio signal based on the position and direction of travel of the motor vehicle.

8. The method of claim 7, further comprising:
receiving a radio data system (RDS) signal associated with the first one of an FM radio signal and an AM radio signal; and
selectively configuring the at least one of the plurality of antennas to focus on the first one of an FM radio signal and an AM radio signal associated with the RDS.

9. The method of claim 7, further comprising: selectively configuring the at least one of the plurality of antennas to reduce electromagnetic interference.

10. The method of claim 7, wherein selectively configuring the at least one of the plurality of antennas to reduce electromagnetic interference includes receiving electromagnetic compatibility (EMC) data associated with the motor vehicle.

11. The method of claim 7, wherein selectively configuring the at least one of a plurality of antennas includes configuring multiple antennas of the plurality of antennas.

12. The method of claim 7, wherein selectively configuring the at least one of the plurality of antennas includes formulating an antenna algorithm to enhance reception of the desired radio signal.

13. The method of claim 12, wherein receiving the first one of an FM radio signal and an AM radio signal includes receiving a first radio signal having a first signal strength and receiving the second one of the FM radio signal and the AM radio signal includes receiving a second radio signal having a second strength, the second strength being greater than the first strength.

14. The method of claim 7, wherein selectively configuring the at least one of the plurality of antennas includes identifying a broadcast location of the first one of an FM radio signal and an AM radio signal.

15. The method of claim 14, wherein identifying a broadcast location of the first one of an FM radio signal and an AM radio signal includes retrieving broadcast tower location data from a look up table stored in a memory.

16. The method of claim 7, further comprising: designating the first one of an FM radio signal and an AM radio signal as a desired radio signal.

17. The method of claim 16, wherein designating the first one of an FM radio signal and an AM radio signal includes identifying a radio signal prior to the interference.

18. The method of claim 16, wherein designating the first one of an FM radio signal and an AM radio signal includes receiving a radio pre-set input.

19. The method of claim 7, further comprising: selectively re-configuring at least one of a plurality of antennas to focus on the first one of an FM radio signal and an AM radio signal as the motor vehicle travels from the position along the direction of travel.

\* \* \* \* \*